Patented Feb. 19, 1952

2,586,572

UNITED STATES PATENT OFFICE 2,586,572

STYRENE DRYING-OIL COPOLYMERS

John Joseph Sleightholme, Carlisle, and Wallace Thomas Craven Hammond, London, England, assignors, by mesne assignments, to The Sherwin-Williams Company, Cleveland, Ohio, a corporation of Ohio No Drawing. Application February 16, 1949, Serial No. 76,858. In Great Britain February 17, 1948

13 Claims. (Cl. 260—23)

This invention is for improvements in or relating to styrene-drying-oil copolymers and has for an object to provide a new class of such copolymers which are useful as surface coatings or for impregnation purposes.

The invention has for an object to provide copolymers of styrene and related compounds, polyhydric alcoholic mixed esters and the unsaturated aromatic residues contained in the extract resulting from the treatment of mineral lubricating oils with selective solvents, such as liquid $SO_2$, by the Edeleanu process, referred to in "Modern Petroleum Technology," published by the Institute of Petroleum, in London, in 1946. The aromatic petroleum residues are soluble in white spirit and solvent naphtha and are believed to consist of mixtures of complex cyclic unsaturated hydrocarbons, as described in "Industrial Chemistry," by E. R. Riegel, 3rd Ed., 1937, Reinhold Publishing Corporation, page 403. Examples of such materials, hereinafter referred to as "aromatic petroleum residues," are the materials sold under the trade names Iranolin, Dutrex and Petromor.

In copending U. S. Patent Application No. 76,857, filed February 16, 1949, there is described the production of copolymers of styrene or substitution products thereof with the aromatic petroleum residues; these products are, in general, incompatible with drying oils whereas an object of the present invention is to provide a range of products in which a drying oil is believed to be incorporated into the copolymer molecule.

The expression "polyhydric alcoholic mixed ester" as used herein means an ester of a polyhydric alcohol and one or more highly unsaturated fatty acids with or without fatty acids of other types and with or without a polybasic acid and includes the case in which, where a polybasic acid radicle is present, more than one polyhydric alcohol enters into the ester molecule. By a "highly unsaturated fatty acid" we mean a fatty acid containing at least two double bonds in the molecule which double bonds may be either conjugated or non-conjugated.

According to the present invention there is provided a process for the production of a copolymer which comprises heating a mixture of styrene, or a nuclear alkyl or halogen substitution product thereof, an aromatic petroleum residue as hereinbefore defined and one or more polyhydric alcoholic mixed esters as hereinbefore defined; the process is preferably carried out by heating the reaction mixture under reflux.

We find that it is advantageous to carry out the reaction under pressure as thereby, particularly when pressures in excess of 1 atmosphere superatmospheric pressure are used, there results a very marked reduction in the reaction time required to effect a substantially complete copolymerisation.

The copolymerisation reaction may be carried out in solution, for example, in an aromatic solvent such as xylene.

The invention also includes the control of the molecular complexity of the copolymers by carrying out the reaction in the presence of a mono-cyclic alpha-terpene or, alternatively, in the presence of sulphur in amounts of ½ to 5%, preferably 1% to 2½%, by weight of the polyhydric alcoholic mixed ester.

A still further feature of the invention consists in that the styrene or related compound is added to the reaction mixture during the course of the reaction, that is to say, that a part only of the styrene is present in the initial reaction mixture and the remainder of the required quantity of styrene is added, either portion-wise or continuously, during the course of the copolymerisation reaction; we also find that in some cases advantages arise from the addition of the mono-cyclic alpha-terpene to the reaction mixture during the course of the reaction, this addition being made either continuously or portion-wise as desired.

The aromatic petroleum residues have, in the past, been used to a certain extent with a view to replacing some of the drying oils used in the conventional paint media with a view to reducing the cost thereof or with a view to overcoming the difficulties of shortage of supply of such drying oils. However, these aromatic petroleum residues have the disadvantage that, when they are added to drying oils or varnishes, as has been practised heretofore, the products thus obtained dry very slowly.

The process of the present invention makes it possible, however, to incorporate considerable proportions of the aromatic petroleum residues into the styrene oil copolymers and at the same time to produce varnishes which are quick drying. It will be appreciated that there is considerable advantage to be derived from the use of these aromatic petroleum residues by copolymerising them, since the slowing down of the drying time hitherto experienced on the mere admixture of these residues with paint media does not occur and, in fact, in some instances the drying time is even more rapid.

A very wide range of products is possible within the scope of the present invention and the properties of the final copolymerisation products obtained may be varied as required by controlling the proportions of the aromatic petroleum residues to the styrene or drying oil.

The use of the monocyclic alpha-terpene or of the sulphur makes it possible to produce reaction products which are homogeneous from reaction mixtures which otherwise would produce a heterogeneous and substantially valueless mass.

The following examples illustrate the manner in which the invention may be carried into effect:

*Example 1*

132 grams of a 7-poise dehydrated castor oil were dissolved in 150 grams of xylene together with 33 grams of the aromatic petroleum residues and 135 grams of monomeric styrene.

The reaction mixture was heated under reflux for 11¾ hours at the end of which time the reaction product had a solids content of 54% by weight and a viscosity of 165 seconds in a No. 4 Ford Cup at 25° C.

A further 150 grams of xylene were then added to the reaction mixture and the heating under reflux was continued for a further 21 hours to produce a final product which had a viscosity of 48 seconds in a No. 4 Ford Cup at 25° C. and had a solids content of 4% by weight.

When lead and cobalt naphthenates were added in amounts such as to give a content of 0.3% of lead and 0.07% of cobalt (calculated as the metals) by weight of the non-volatile solids of the solution, there was produced a clear tough film when the solution was poured and allowed to dry, the drying time being about two hours.

*Example 2*

120 grams of the aromatic petroleum residues were mixed with 150 grams of monomeric styrene and 30 grams of a 7-poise dehydrated castor oil.

0.4 gram of sulphur was then added and the reaction mixture was heated under reflux for 4½ hours at the conclusion of which time the temperature had risen to 200° C.

The reaction product was a soft dark balsam which was soluble in xylene. When lead and cobalt naphthenate driers (in amounts such as to give a content of 0.5% of lead and 0.05% of cobalt (calculated as the metals) by weight of the non-volatile solids of the solution) were added and a film poured from the xylene solution, there was produced a clear film which dried in 2 hours.

*Example 3*

125 grams of the aromatic petroleum residues were mixed with 150 grams of monomeric styrene and 75 grams of alkali-refined linseed oil; 1 gram of sulphur was then added to the reaction mixture which was heated under reflux for 3½ hours at the end of which time the temperature had reached 200° C.

The reaction product was a viscous oil which, on addition of lead and cobalt naphthenate driers (in amounts such as to give a content of 0.5% of lead and 0.05% of cobalt (calculated as the metals) by weight of the non-volatile solids of the solution), and thinning to brushing consistency with xylene, yielded a slightly opalescent film which dried in 18 hours.

The result obtained when the foregoing reaction was repeated but in the absence of sulphur, was that a heterogeneous mass was produced.

*Example 4*

125 grams of the aromatic petroleum residues were mixed with 150 grams of monomeric styrene and 75 grams of wood oil. 1 gram of sulphur was then added to the mixture which was then heated under reflux for 4½ hours at the end of which time the temperature had risen to 200° C.

The reaction mixture, when cool, was a dark, clear balsam having a solids content of 95% by weight.

On addition of driers in the form of lead naphthenate and cobalt naphthenate in amounts such as to give a content of 0.4% of lead and 0.05% of cobalt (calculated as the metals) by weight of the non-volatile solids of the solution and thinning to brushing consistency with xylene, a tough, clear film was obtained which dried in 6 hours.

If the process was repeated as above but in the absence of the sulphur, it was found that the reaction mixture gelled in 6 hours.

*Example 5*

125 grams of the aromatic petroleum residues were mixed with 150 grams of monomeric styrene and 75 grams of oiticica oil. 1 gram of sulphur was then added to the mixture which was then heated under reflux for 3½ hours at the end of which time the temperature had risen to 200° C.

A film prepared from the final reaction product, thinned to brushing consistency with xylene, formed a tough, clear film which dried under the influence of lead and cobalt naphthenate driers in amounts such as to give a content of 0.4% of lead and 0.05% of cobalt (calculated as the metals) by weight of the non-volatile solids of the solution in a period of 5 hours.

We have found that by incorporating a higher fatty soap-forming acid in the reaction mixture or in the reaction product, we can produce products which will readily form an emulsion on mixing with an aqueous alkaline solution without the necessity of adding any emulsifying agent; if the soap-forming acid is unsaturated and is added before or during the copolymerisation reaction, then it may enter into the copolymer molecule. Such emulsifiable products are particularly suitable for the production of emulsion paints and the emulsions can be used either as coating or as impregnating compositions for a wide variety of purposes.

When the aqueous alkaline solution is ammonia or a solution of volatile organic base then, on drying, the ammonia or the said base will be volatilised whereby the water-resistance of the deposit is enhanced as compared with that produced with the use of a non-volatile base.

What we claim is:

1. A process for the production of a copolymer which comprises heating a mixture of styrene with the unsaturated aromatic extract obtained from lubricating oils treated by the Edeleanu process and with a polyhydric alcoholic mixed ester containing unsaturated drying oil fatty acid radicles, the ratio by weight of styrene to extract being from about 4:1 to about 1.2:1, and the mixed ester comprising from 10% to 44% by weight of the mixture.

2. A process according to claim 1 wherein the copolymerisation is effected by heating the reaction mixture under reflux.

3. A process according to claim 1 wherein the copolymerisation is effected under superatmospheric pressure.

4. A process according to claim 1 wherein the copolymerisation is effected in solution in a solvent for the several ingredients.

5. A process according to claim 4 wherein the solvent is an aromatic solvent.

6. A process according to claim 1 wherein the copolymerisation is effected in the presence of sulphur in an amount of ½% to 5% by weight of the polyhydric alcoholic mixed ester.

7. A process according to claim 1 wherein the copolymerisation is effected in the presence of a monocyclic alpha terpene.

8. A process according to claim 7 wherein the monocyclic alpha terpene is added to the reaction mixture during the course of the reaction.

9. A process according to claim 1 wherein a part only of the styrene is present in the initial reaction mixture and the remainder of the required quantity of styrene is added during the course of the copolymerisation reaction.

10. A process according to claim 1 wherein a higher fatty soap-forming acid is added to the reaction mixture.

11. A process according to claim 10 wherein said soap-forming acid is unsaturated and is copolymerised with the other ingredients of the reaction mixture.

12. A new composition of matter comprising a copolymer of styrene with the unsaturated aromatic extract obtained from lubricating oils treated by the Edeleanu process and with a polyhydric alcoholic mixed ester containing unsaturated drying oil fatty acid radicles, the ratio by weight of styrene to extract being from about 4:1 to about 1.2:1 and said mixed ester comprising from 10% to 44% by weight of the whole.

13. A new composition of matter as claimed in claim 12 wherein said mixed ester is a fatty drying oil.

JOHN JOSEPH SLEIGHTHOLME.
WALLACE THOMAS CRAVEN HAMMOND.

REFERENCES CITED

The following references are of record in the file of this patent:

UNITED STATES PATENTS

| Number | Name | Date |
| --- | --- | --- |
| 2,371,652 | Rostler et al. | Mar. 20, 1945 |
| 2,395,504 | Rubens et al. | Feb. 26, 1946 |
| 2,455,890 | Fawcett et al. | Dec. 7, 1948 |
| 2,468,748 | Griess et al. | May 3, 1949 |
| 2,468,798 | Young et al. | May 3, 1949 |

OTHER REFERENCES

Emulsions, 7th Ed. Carbide & Carbon Chem. Co. 1946, page 21.